H. G. JUNGK.
CONTROL APPARATUS.
APPLICATION FILED OCT. 13, 1917.
1,323,289.
Patented Dec. 2, 1919.
2 SHEETS—SHEET 1.
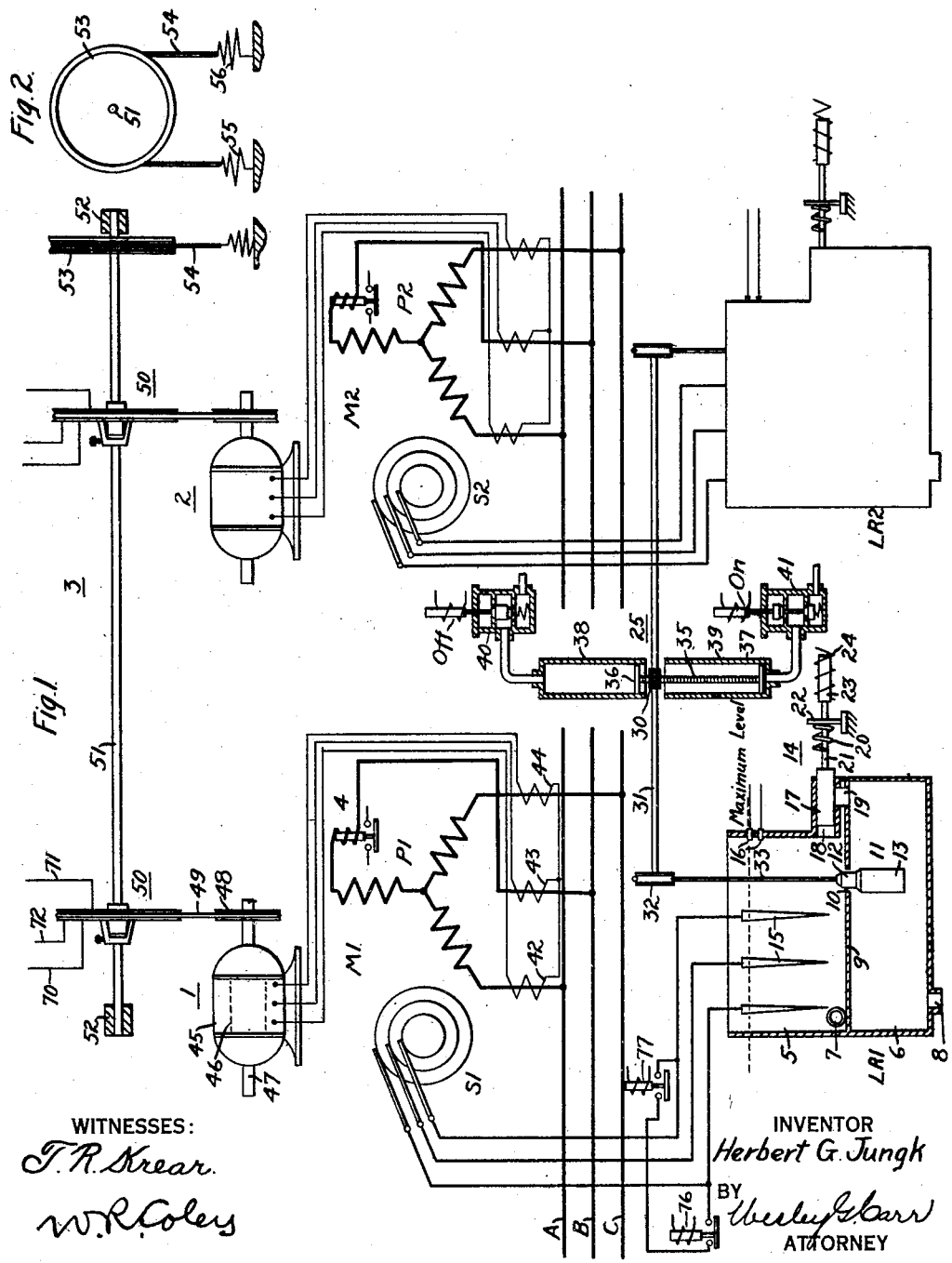
WITNESSES:
T. R. Krear.
W. R. Coles
INVENTOR
Herbert G. Jungk
BY
ATTORNEY H. G. JUNGK.
CONTROL APPARATUS.
APPLICATION FILED OCT. 13, 1917.
1,323,289.
Patented Dec. 2, 1919.
2 SHEETS—SHEET 2.
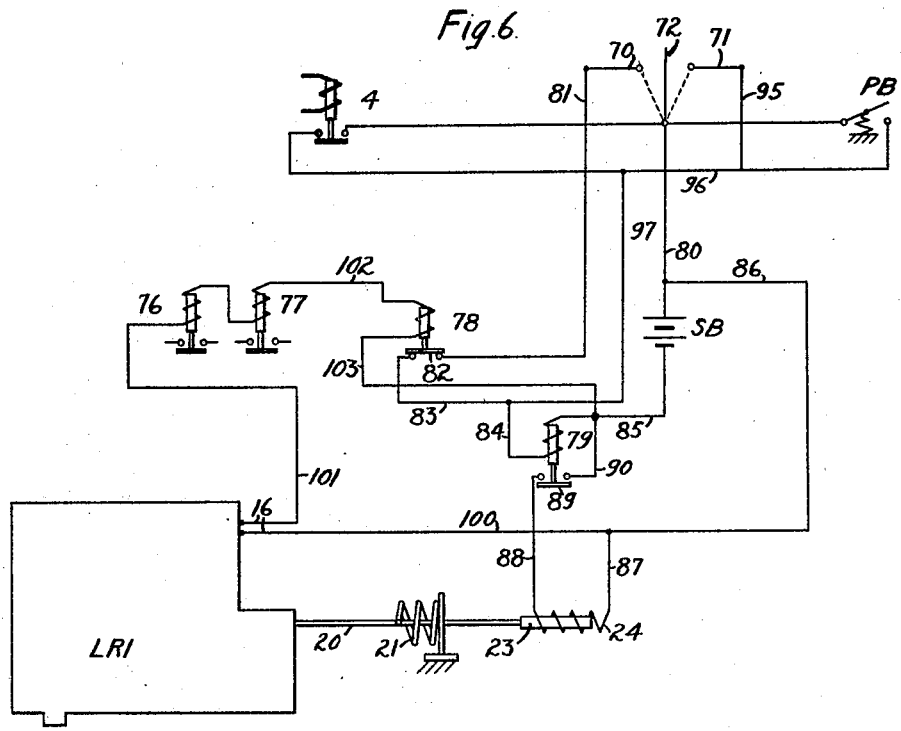
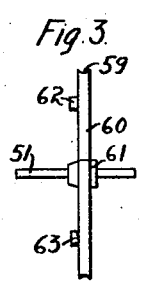
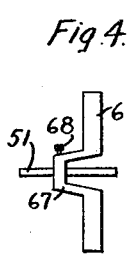
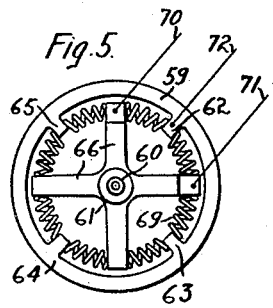
WITNESSES:
INVENTOR
Herbert G. Jungk
BY
ATTORNEY

UNITED STATES PATENT OFFICE.

HERBERT G. JUNGK, OF PITTSBURGH, PENNSYLVANIA, ASSIGNOR TO WESTINGHOUSE ELECTRIC & MANUFACTURING COMPANY, A CORPORATION OF PENNSYLVANIA.

CONTROL APPARATUS.

1,323,289.   Specification of Letters Patent.   Patented Dec. 2, 1919.

Application filed October 13, 1917. Serial No. 196,385.

*To all whom it may concern:*

Be it known that I, HERBERT G. JUNGK, a citizen of the United States, and a resident of Pittsburgh, in the county of Allegheny and State of Pennsylvania, have invented a new and useful Improvement in Control Apparatus, of which the following is a specification.

My invention relates to control apparatus that is employed in conjunction with liquid-rheostat operation and especially to apparatus that is utilized in the automatic regulation of polyphase induction motors.

One object of my invention is to provide a relatively simple and effective apparatus for automatically governing a plurality of liquid rheostats in accordance with the load carried by the corresponding driving motors, whereby a substantially uniform load may be maintained upon the several motors during the complete operation thereof.

More specifically stated, it is the object of my invention to provide a mechanical device for balancing each of the driving motor loads against the average load of the motors and for effecting certain simple circuit connections in accordance with the movements of that portion of the device corresponding to each individual motor for varying the load thereupon in accordance with the difference between that load and the average load of all the motors.

Other minor objects of my invention will be evident from the following detailed description and are set forth with particularity in the appended claims.

My invention may best be understood by reference to the accompanying drawings, wherein Figure 1 is a semidiagrammatic view of a system of control including apparatus that embodies the principles of the present invention; Fig. 2 is a view, in end elevation, of a portion of the control apparatus that is shown in Fig. 1; Fig. 3, Fig. 4 and Fig. 5 are elevational views serving to illustrate the principles of construction of a portion of the control apparatus of Fig. 1; and Fig. 6 is a diagrammatic view of an auxiliary system of control for automatically governing a portion of the circuit connections of Fig. 1.

Referring to Fig. 1 of the drawings, the system shown comprises a polyphase supply circuit including conductors A, B and C; a plurality of vehicle-driving induction motors M1 and M2, respectively having primary stator windings P1 and P2 and secondary or rotor windings S1 and S2; a plurality of liquid rheostats LR1 and LR2 for varying the secondary-circuit resistance of the respective driving motors; an automatic balancing or regulating apparatus comprising torque motors 1 and 2 that are energized in accordance with the respective main-motor loads for manipulating a load-averaging or equalizing mechanism 3; a current relay 4 that is connected in one primary phase for a purpose to be explained in connection with Fig. 6; and a plurality of rheostat-short-circuiting switches 76 and 77.

In the interests of clarity and simplicity, only the circuit connections that are necessary to set forth the principles of my invention are illustrated, and the customary control apparatus including switches for connecting the motors to the supply circuit, etc. are omitted. It will be understood, however, that suitable switching apparatus and auxiliary governing circuits therefor are actually employed in practising the present invention. The number and particular form of the driving induction motors other than being of the wound-rotor type, are immaterial to my present invention, and, consequently, only two motors have been shown, although the invention is capable of ready application to any desired number of driving motors or units.

The liquid rheostats LR1 and LR2 are identical in construction and each comprises an upper electrode-containing tank 5 and a lower communicating reservoir 6, an inlet pipe 7 and an outlet pipe 8 being suitably associated with the tank 5 and the reservoir 6, respectively. Preferably, a continuous circulation of electrolyte is maintained through the rheostats by any well-known pumping device (not shown).

The floor or partition that separates the tank 5 from the reservoir 6 has a single opening 10 which is adapted to coöperate with a double-diameter vertically-movable valve member 11. The upper hollow cylindrical portion 12 of the valve normally rests within the floor opening 10 and being of a smaller diameter than that opening, the electrolyte from the inlet pipe 7 is normally discharged through the opening 10 around the valve portion 12 and into the reservoir 6. However, a lower hollow cylindrical valve portion 13, having approximately the same diameter as the floor opening 10, is provided, whereby, upon upward movement of the valve to a position wherein the lower portion 13 is located within the opening 10, the electrolyte is then forced to rise to the top of the valve and discharge downwardly through it. Thus, the vertical position of the valve member 11 determines the height of the electrolyte in the tank 5 under normal operating conditions. The valve members 11 of the several liquid rheostats are operated concurrently so that the liquid level during normal running periods of the driving motors is similarly varied in each of the liquid rheostats.

However, to provide an auxiliary or independent method for individually varying the liquid level in the rheostats, a plunger valve mechanism 14 is provided, whereby the load of each individual motor may be independently varied with respect to the other motors.

The plunger valve 14 comprises a suitable cylinder or plunger 17 that normally prevents communication between an outlet 18 from the electrode-containing tank 5 and a discharge port 19 that communicates with the reservoir 6. A suitable coil spring 20 has one end secured to the valve rod 21, the other end bearing against a stationary supporting bracket or standard 22 through which the valve rod extends. The outer end of the valve rod constitutes a magnetizable core member 23 around which is wound an actuating coil 24 for moving the plunger valve to a position permitting communication between the tank openings 18 and 19 when the coil 24 is energized to oppose the normal biasing action of the spring 20.

A plurality of main electrodes or plates 15 are suitably located within the rheostat tank 5 and are respectively connected to the terminals of the secondary or rotor winding of the corresponding induction motor. In addition, an electrolytic interlock, comprising a pair of small plates or wires 16, is provided for closing a certain auxiliary circuit to be described in connection with Fig. 6 when the liquid level rises to the plane marked "Maximum level".

The rheostat main valves 11 are provided with a common actuating mechanism 25, the movement of which is transmitted to each valve through a pinion 30, which is mounted upon a rotatable shaft 31, to pulleys or sheaves 32, to each of which is suitably attached a rope or cable 33 that carries the corresponding rheostat main valve 11.

The actuating mechanism 25 is of a familiar electrically-controlled, pneumatically-operated type comprising a rack member 35 that meshes with the pinion 30 and the opposite ends of which constitute pistons 36 and 37 that operate within appropriate cylinders 38 and 39, respectively. A normally open valve 40, having an actuating coil Off, communicates with the outer end of the cylinder 38, while a normally closed valve 41, having an actuating coil On, is associated with the outer end of the other cylinder 39. Fluid pressure from any suitable source (not shown) is conveyed to the valves 40 and 41, whereby the mechanism is normally biased to the illustrated extreme lower position.

The operation of the device just described may be set forth as follows: upon concurrent energization of the actuating coils On and Off, the initial unbalanced fluid-pressure conditions are reversed, that is, fluid pressure is admitted to the cylinder 39 through the valve 41 and is released from the cylinder 38 through the valve 40 to the atmosphere. Consequently, an upward movement of the pistons 36 and 37, entailing a corresponding upward movement of the rheostat main valves 11, ensues. To arrest such movement at any time, it is merely necessary to deënergize the off coil, whereupon balanced high-fluid-pressure conditions obtain in the mechanism and a positive and reliable stoppage thereof is secured.

To produce return movement of the apparatus, the actuating coils On and Off are concurrently deënergized, whereby fluid-pressure conditions revert to the original state and the desired backward movement is effected.

A plurality of series transformers, having star-connected secondary windings 42, 43 and 44, are energized in accordance with the currents traversing the three main conductors for the induction motor primary winding P1, the transformed polyphase electromotive force thus obtained being employed for driving the torque motor 1, which is thus actuated in accordance with the value of primary current in the motor M1, that is to say, in accordance with the load of that particular motor.

The torque motor 1 may be of any familiar construction, comprising a wound stator 45, which is connected to the secondary windings 42, 43 and 44 of the series transformers, and a rotor winding 46 that is mounted upon a shaft 47. A pulley or sheave 48 is secured to one end of the torque-motor shaft 47, and a belt or cable 49 serves to operatively connect the sheave 48 with the corresponding mechanism 50 of the load-equalizing or averaging device 3.

The equalizing apparatus 3 is shown as comprising a shaft or axle 51 that is supported in suitable end bearings 52 and a rigidly-mounted sheave or pulley 53 having a belt or cable 54 passing around it, the opposite ends of the belt being secured to centering coil springs 55 and 56, whereby the shaft 51 is normally maintained in an average or balanced position.

The remaining electrical and mechanical system that is associated with the other illustrated driving motor M2 is identical to that already described, the torque motor 2 being employed to manipulate the equalizing device 3 in accordance with the load upon the motor M2, as subsequently more fully set forth.

The details of the equalizing mechanism 50 are shown in Fig. 3, Fig. 4 and Fig. 5. In general, the mechanism comprises a rim member that is shown in Fig. 3 and a hub member that is illustrated in Fig. 4, the two members being resiliently connected the one to the other. The rim member is shown as comprising a circumferential band or grooved rim 59 and an interior supporting disk 60, or the equivalent, which is mounted upon a hub 61 that loosely incloses the shaft 51. The rim 59 is further provided with a plurality of equally spaced inwardly projecting lugs or ears 62, 63, 64 and 65 for a purpose to be set forth. The lug 62 is suitably electrically insulated from the remainder of the rim member.

The hub member (Fig. 4) comprises a plurality of equally spaced arms 66, which are integrally or otherwise secured to a hollow hub 67 that loosely fits over the hub 61 of the rim member and is rigidly secured to the shaft 51 by means of a set-screw 68, for example. A plurality of coil springs 69 are located between the adjacent pairs of rim-member lugs and hub-member arms, as clearly shown in Fig. 5, whereby a rotative movement of the rim member through the agency of the torque motor 1, for example, is resiliently transmitted through the springs 69 in the one or the other direction to the arms 66 of the hub member and thus to the shaft 51 of the complete equalizing device in opposition to the action of the one or the other of the centering springs 55 and 56 thereof.

In this way, the load of each main driving motor, as registered by the corresponding torque motor, is balanced against an average condition represented by the biasing of the shaft 51 and corresponding to average load conditions of the several driving motors. In other words, each individual equalizing mechanism 50 may operate in the one or the other direction, dependent upon the load of the corresponding main motor, and the main sheave 53, together with the associated centering springs 55 and 56, will permit a movement of the shaft 51 that represents the combined or average movements of the individual equalizing mechanisms 50.

To employ such movements of each equalizing mechanism 50 to govern the corresponding main-motor secondary-circuit resistance, the two adjacent arms 66 and the intermediate lug 62 (Fig. 5) are respectively electrically connected to a plurality of flexible conductors 70, 71 and 72, respectively. It will be understood that the several metallic parts to be connected in electrical circuits are suitably insulated from the remainder of the mechanism.

Referring now to Fig. 6, a system of auxiliary electrical connections, corresponding to driving motor M1 only, for utilizing the movements of the equalizing mechanism 50 in accordance with the principles of my invention, is shown. It will be understood that a similar set of auxiliary circuits is provided for each of the main motors.

The auxiliary circuits shown in Fig. 6 comprise the actuating coil 24 for the auxiliary or plunger valve 14; the flexible conductors 70, 71 and 72 of the equalizing mechanism 50; a plurality of electrically-controlled switches 76 and 77, and auxiliary relays 78 and 79; the auxiliary contact members of the current relay 4; a push-button PB; and a storage battery SB, or other source of energy.

It may be assumed that a counter-clockwise movement of the hub member, as viewed in Fig. 5, corresponds to a predetermined increased load upon the main motor M1 and a correspondingly increased energization of the torque motor 1. Under such conditions, the vertical arm 66 comes in contact with the lug member 62, whereby an electrical connection between the conductors 70 and 72 is effected.

Consequently, an auxiliary circuit is established from the positive terminal of the storage battery SB through conductor 80, flexible conductors 72 and 70, conductor 81, contact disk 82 of the relay device 8, in its lower or normal position, conductors 83 and 84, the actuating coil of the relay 79 and conductor 85 to the negative terminal of the battery SB.

Upon the closure of the relay 79, a further circuit is completed from the positive terminal of the battery SB through conductors 86 and 87, actuating coil 24 for the plunger valve 14, conductor 88, bridging contact member 89 of the relay 79 and conductors 90 and 85 to the battery. Such energization of the actuating coil 24 effects a withdrawal of the valve plunger 17 to permit the discharge of electrolyte from the tank 5 through openings 18 and 19 to the reservoir 6. In this way, the secondary-circuit resistance of the motor M1 is automatically increased to thereby reduce the load of the motor to the desired average value, whereupon the corresponding equalizing mechanism 50 reassumes its illustrated normal position to interrupt the electrical circuits just traced.

On the other hand, if, at any time, the vehicle wheels "slip" or "skid" so that temporarily a relatively low main-motor current obtains, then the torque motor 1 will actuate the corresponding equalizing mechanism 50 in the opposite direction to effect electrical connection between conductors 71 and 72.

Consequently, an auxiliary circuit is established from the positive conductor 80 through flexible conductors 72 and 71, conductors 95, 96, 97 and 84 and thence through the actuating coil for the relay 79 to the negative battery terminal. The relay 79 is thus again closed to effect energization of the actuating coil 24 for the plunger valve 14 to lower the liquid level in the tank LR1 and to automatically reduce the speed of the "slipping" motor until normal current and tractive conditions thereof again obtain, at which time the corresponding equalizing mechanism 50 will reassume its normal balanced position.

However, when the liquid level in the liquid rheostat LR1 has reached its maximum height to permit the usual closure of the short-circuiting switches 76 and 77, it is undesirable to allow a reduction in the liquid level under the temporary high-current or surging conditions that ensue upon the closure of such switches. To prevent such action, the following circuits are employed, assuming a maximum liquid level that immerses both plates or conductors 16 of the electrolytic interlock to complete the connection thereof.

Under such conditions, a new circuit is continued from the positively-energized conductor 86 through conductor 100, both plates 16 of the electrolytic interlock, conductor 101, actuating coils of the short-circuiting switches 76 and 77, conductor 102, actuating coil of the relay 78 and conductor 103 to the negative conductor 85. In this way, the short-circuiting switches 76 and 77 are closed and the relay 78 is held in its upper position to interrupt the previously-traced circuit including the flexible conductors 70 and 72, the connection of which corresponds to higher-than-average load conditions in the driving motor. However, it is still desirable to permit a reduction of the liquid level in the rheostat in the event of motor "slipping", and, consequently, the previously-traced circuit for effecting such action is undisturbed by the closure of the short-circuiting switches 76 and 77.

If, for any reason, the primary motor current exceeds a critical value corresponding to the setting of the current relay 4, the relay will be lifted to its upper position to directly connect conductors 80 and 97, whereby the liquid level is automatically reduced to correspondingly lower the motor load.

Furthermore, the train operator may manually reduce the liquid level in any desired rheostat by actuating the corresponding push-button PB to again directly connect conductors 80 and 97 and effect the previously-described regulating operation.

It will be seen that I have thus provided a regulating system of the liquid-rheostat type for induction motors, wherein a common device for concurrently varying all the liquid levels and a plurality of independent devices for individually varying such levels, in accordance with load conditions of the respective motors, are employed.

It will be appreciated that, if desired, my invention may readily be employed in conjunction with a single large rheostat having a plurality of contiguous electrode-containing tanks corresponding to the respective motors and a common reservoir, together with common pumping and air-cooling systems. The chief additional advantage of such a structure is its compactness, and other desirable features, which are also present in the illustrated simple form of my invention, embrace the use of a liquid having the same density in all rheostats, together with relatively low weight and first cost of the entire apparatus.

I do not wish to be restricted to the particular circuit connections, structural details or arrangement of parts herein set forth, as various modifications thereof may be effected without departing from the spirit and scope of my invention. I desire, therefore, that only such limitations shall be imposed as are indicated in the appended claims.

I claim as my invention:

1. In a system of control, the combination with a plurality of dynamo-electric machines connected to a common load, of a plurality of liquid rheostats associated with the respective machines, valve means for concurrently varying the effective resistance values of said rheostats, and independent valve means for individually varying such values under predetermined conditions.

2. In a system of control, the combination with a plurality of dynamo-electric machines connected to a common load, of a plurality of liquid rheostats associated with the respective machines, valve means for concurrently varying the liquid levels in said rheostats, and a plurality of independent valve means for individually varying the liquid levels under predetermined conditions.

3. In a system of control, the combination with a plurality of dynamo-electric machines connected to a common load, of a plurality of liquid rheostats associated with the respective machines, a plurality of main valves for varying the liquid level, a plurality of auxiliary valves, means for concurrently operating the main valves, and means for operating the auxiliary valves independently of each other and of the main valves.

4. In a system of control, the combination with a plurality of dynamo-electric machines connected to a common load, of a plurality of liquid rheostats associated with the respective machines, valve means for concurrently varying the effective resistance values of said rheostats, and independent valve means for automatically varying such values to maintain a substantial equalization of loads upon the machines.

5. In a system of control, the combination with a plurality of dynamo-electric machines connected to a common load, of a plurality of liquid rheostats associated with the respective machines, valve means for concurrently varying the liquid levels in said rheostats, and a plurality of independent valve means for automatically varying the liquid levels to maintain a substantial equalization of loads upon the machines.

6. In a system of control, the combination with a plurality of dynamo-electric machines connected to a common load, of a plurality of liquid rheostats associated with the respective machines, a plurality of main valves for varying the liquid level, a plurality of auxiliary valves, means for concurrently operating the main valves, and automatic means for independently operating the auxiliary valves to maintain a substantial equalization of loads upon the machines.

7. In a system of control, the combination with a plurality of dynamo-electric machines connected to a common load, of a plurality of variable resistors associated with the respective machines, means for concurrently varying said resistors, auxiliary means for individually varying said resistors, and means dependent upon the relative loads of said machines for operating said auxiliary means.

8. In a system of control, the combination with a plurality of dynamo-electric machines connected to a common load, of a plurality of liquid rheostats associated with the respective machines, means for concurrently varying the active volumes of liquid in said rheostats, auxiliary means for individually varying the respective liquid volumes, and means dependent upon the relative loads of said machines for operating said auxiliary means.

9. In a system of control, the combination with a plurality of dynamo-electric machines connected to a common load, of a plurality of liquid rheostats associated with the respective machines, a plurality of main valves for varying the liquid level, a plurality of auxiliary valves, means for concurrently operating the main valves, and means dependent upon the relative loads of said machines for operating said auxiliary valves.

10. In a system of control, the combination with a plurality of dynamo-electric machines connected to a common load, of a plurality of liquid rheostats associated with the respective machines, a plurality of main valves for varying the liquid level, a plurality of auxiliary valves, means for concurrently operating the main valves, a plurality of torque motors energized in accordance with the loads of the respective machines, and a plurality of mechanically associated equalizing devices actuated by the respective torque motors for governing said auxiliary valves.

11. In a system of control, the combination with a plurality of main polyphase motors severally having primary and secondary windings and connected to a common load, of a plurality of liquid rheostats connected in circuit with the respective secondary windings, a plurality of main valves for varying the liquid level, a plurality of normally closed auxiliary valves having actuating coils, means for concurrently operating the main valves, a plurality of polyphase torque motors energized in accordance with the loads of the respective main motors, a plurality of resiliently associated equalizing devices actuated in either direction by the respective torque motors, and electrical connections governed by such actuation for energizing the corresponding auxiliary-valve coil under relatively high or low load conditions of the corresponding main motor.

In testimony whereof I have hereunto subscribed my name this 26th day of Sept., 1917.

HERBERT G. JUNGK.